United States Patent
Ookoba (10) Patent No.: US 12,295,902 B2
(45) Date of Patent: May 13, 2025

(54) LOAD REDUCTION DEVICE, CONTROL DEVICE, LOAD REDUCTION METHOD, AND STORAGE MEDIUM FOR STORING PROGRAM

(71) Applicant: NEC Corporation, Tokyo (JP)

(72) Inventor: Tadashi Ookoba, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1011 days.

(21) Appl. No.: 17/292,914

(22) PCT Filed: Nov. 8, 2019

(86) PCT No.: PCT/JP2019/043890
§ 371 (c)(1),
(2) Date: May 11, 2021

(87) PCT Pub. No.: WO2020/100742
PCT Pub. Date: May 22, 2020

(65) Prior Publication Data
US 2021/0401658 A1    Dec. 30, 2021

(30) Foreign Application Priority Data
Nov. 13, 2018    (JP) .................................. 2018-212803

(51) Int. Cl.
*A61H 3/00*    (2006.01)
*A45F 3/08*    (2006.01)
(Continued)

(52) U.S. Cl.
CPC ................ *A61H 3/00* (2013.01); *A45F 3/08* (2013.01); *A61H 1/0262* (2013.01);
(Continued)

(58) Field of Classification Search
CPC .. A61B 5/6811; A61F 2/64; A61F 2002/7615; A61F 2002/5004; A61F 2/72;
(Continued)

(56) References Cited

U.S. PATENT DOCUMENTS

2004/0261561 A1    12/2004    Takenaka et al.
2006/0249315 A1    11/2006    Herr et al.
(Continued)

FOREIGN PATENT DOCUMENTS

CN    1868434 A    11/2006
CN    205019361 U    2/2016
(Continued)

OTHER PUBLICATIONS

International Search Report of PCT Application No. PCT/JP2019/043890 mailed Feb. 4, 2020.
(Continued)

*Primary Examiner* — Seema Mathew (57) ABSTRACT

This load reduction device is provided with: a shock absorption mechanism configured to absorb impact force generated when a user moves; a drive mechanism configured to output torque for reducing a load applied to the user at a joint of a leg of the user; and a torque control unit configured to control the torque output by the drive mechanism on the basis of operation of the shock absorption mechanism.

5 Claims, 9 Drawing Sheets

(51) Int. Cl.
  *A61H 1/02* (2006.01)
  *B25J 9/00* (2006.01)
  *B25J 9/16* (2006.01)
  *B25J 19/00* (2006.01)
  *A45F 3/00* (2006.01)
  *F16F 13/00* (2006.01)

(52) U.S. Cl.
  CPC .......... *B25J 9/0006* (2013.01); *B25J 9/1633* (2013.01); *B25J 19/0091* (2013.01); *A45F 2003/003* (2013.01); *A61H 2201/018* (2013.01); *A61H 2201/165* (2013.01); *A61H 2201/5007* (2013.01); *F16F 13/00* (2013.01)

(58) Field of Classification Search
  CPC .................. A61F 2/76; A61F 2002/701; A61F 2002/704; B25J 9/1633
  See application file for complete search history.

(56) References Cited

U.S. PATENT DOCUMENTS

| | | | |
|---|---|---|---|
| 2011/0098828 A1* | 4/2011 | Balboni | A61F 2/60 623/40 |
| 2014/0276267 A1* | 9/2014 | Ayyar | A45F 3/08 601/35 |
| 2015/0196403 A1* | 7/2015 | Kim | A61F 2/70 623/24 |
| 2016/0228265 A1 | 8/2016 | Herr et al. | |
| 2017/0259157 A1* | 9/2017 | Stewart | A61B 5/6829 |
| 2017/0360644 A1* | 12/2017 | Hyun | A61H 1/0244 |
| 2018/0147074 A1 | 5/2018 | Battlogg | |
| 2018/0193172 A1 | 7/2018 | Smith et al. | |
| 2018/0228684 A1* | 8/2018 | Park | B25J 9/0006 |
| 2019/0274912 A1* | 9/2019 | Nam | A61H 1/0244 |
| 2021/0197361 A1 | 7/2021 | Baptista et al. | |
| 2024/0382367 A1* | 11/2024 | Asbeck | B25J 9/0006 |

FOREIGN PATENT DOCUMENTS

| | | | | |
|---|---|---|---|---|
| CN | 106798630 A | | 6/2017 | |
| CN | 109070339 A | * | 12/2018 | ............... A61H 3/00 |
| CN | 111452026 A | * | 7/2020 | ............... A61H 3/00 |
| CN | 111531523 A | * | 8/2020 | ............... A61H 3/00 |
| DE | 102016122340 A1 | * | 12/2017 | ........... A43B 3/0005 |
| EP | 3363601 A2 | | 8/2018 | |
| JP | 2011518633 A | | 6/2011 | |
| JP | 2011-217834 A | | 11/2011 | |
| JP | 5126919 B1 | | 1/2013 | |
| JP | 2013-090844 A | | 5/2013 | |
| JP | 2013-158346 A | | 8/2013 | |
| JP | 2014184084 A | | 10/2014 | |
| JP | 2016509960 A | | 4/2016 | |
| JP | 2018061663 A | | 4/2018 | |
| JP | 2018083275 A | | 5/2018 | |
| JP | 2018153911 A | | 10/2018 | |
| WO | WO-2017109190 A1 | * | 6/2017 | ............... A45F 3/10 |
| WO | WO-2018065570 A1 | * | 4/2018 | ............... A61F 2/64 |
| WO | 2018/089543 A1 | | 5/2018 | |

OTHER PUBLICATIONS

CN Office Communication for CN Application No. 201980073363.9, mailed on Jul. 26, 2024 with English Translation.
CN Office Action for CN Application No. 201980073363.9, mailed on Nov. 30, 2023 with English Translation.
Extended European Search Report for EP Application No. EP19883678.5 dated on Jan. 19, 2022.
EP Office Action for EP Application No. 19883678.5, mailed on Oct. 20, 2023.
Japanese Office Action for JP Application No. 2020-555632 mailed on Apr. 5, 2022 with English Translation.

* cited by examiner

LOAD REDUCTION DEVICE, CONTROL DEVICE, LOAD REDUCTION METHOD, AND STORAGE MEDIUM FOR STORING PROGRAM

This application is a National Stage Entry of PCT/JP2019/043890 filed on Nov. 8, 2019, which claims priority from Japanese Patent Application 2018-212803 filed on Nov. 13, 2018, the contents of all of which are incorporated herein by reference, in their entirety.

TECHNICAL FIELD

The present invention relates to a load reduction device, a control device, a load reduction method, and a storage medium for storing a program.

BACKGROUND ART

There is known a load reduction device that performs assistance of a load such as a walking motion of a user and mitigates the load of luggage carried by the user, when worn by the user. The load reduction device is sometimes called a powered suit when wearable by a person.

Some powered suits assist walking movement by driving a link mechanism provided on the user's legs by outputting torque from an actuator to assist muscle strength. Patent Document 1 describes a motion assist device capable of preventing collapse of an actuator in seating. Patent Document 2 discloses a technique for determining the magnitude of drive torque to be generated in a rotation drive part, based on the user's motion detected by a six-axis sensor including a three-axis acceleration sensor and a three-axis gyro sensor for detecting the wearer's motion, and the rotation angle of each of the rotation drive parts. Patent Document 3 describes a walking support device that mitigates the impulsive force due to mechanical play that occurs when the operation is reversed.

CITATION LIST

Patent Literature

[Patent Document 1] Japanese Unexamined Patent Application Publication No. 2018-083275
[Patent Document 2] Japanese Unexamined Patent Application Publication No. 2018-061663
[Patent Document 3] Japanese Unexamined Patent Application Publication No. 2014-184084

SUMMARY OF THE INVENTION

Problems to be Solved by the Invention

However, in the techniques described in Patent Documents 1 to 3, when the user performs agile movements such as running or jumping, a very large torque corresponding to a large impact generated when the user makes contact with the ground is required for each joint. For that reason, the motors and batteries of the actuators for each joint tend to be larger and heavier. Therefore, the problem arises of the load reduction device becoming large and heavy, making it difficult for the user to handle easily.

Therefore, an example object of the present invention is to provide a load reduction device, a control device, a load reduction method, and a storage medium for storing a program that can solve the above-mentioned problems.

Means for Solving the Problems

According to a first aspect of the present invention, a load reduction device is provided with: a shock absorption mechanism configured to absorb impact force generated when a user moves; a drive mechanism configured to output torque for reducing a load applied to the user at a joint of a leg of the user; and a torque control unit configured to control the torque output by the drive mechanism on the basis of operation of the shock absorption mechanism.

According to a second aspect of the present invention, a control device is provided in a load reduction device including a shock absorption mechanism configured to absorb impact force generated when a user moves and a drive mechanism configured to output torque for reducing a load applied to the user at a joint of a leg of the user, in which the control device includes a torque control unit configured to control the torque output by the drive mechanism on the basis of operation of the shock absorption mechanism.

According to a third aspect of the present invention, a load reduction method includes controlling, on the basis of operation of a shock absorption mechanism that absorbs impact force generated when a user moves, torque output by a drive mechanism for reducing a load applied to the user at a joint of a leg of the user.

According to a fourth aspect of the present invention, a program stored in a storage medium causes a computer of a load reduction device to execute processes, the processes includes controlling, on the basis of operation of a shock absorption mechanism that absorbs impact force generated when a user moves, torque output by a drive mechanism for reducing a load applied to the user at a joint of a leg of the user.

Advantageous Effects of Invention

According to the present invention, it is possible to reduce the size and weight of the load reduction device.

EXAMPLE EMBODIMENT

Hereinbelow, a load reduction device, a load reduction method, and a storage medium for storing a program therein according to an embodiment of the present invention will be described with reference to the drawings.

First Embodiment

First, the first embodiment will be described.

Figure 1:
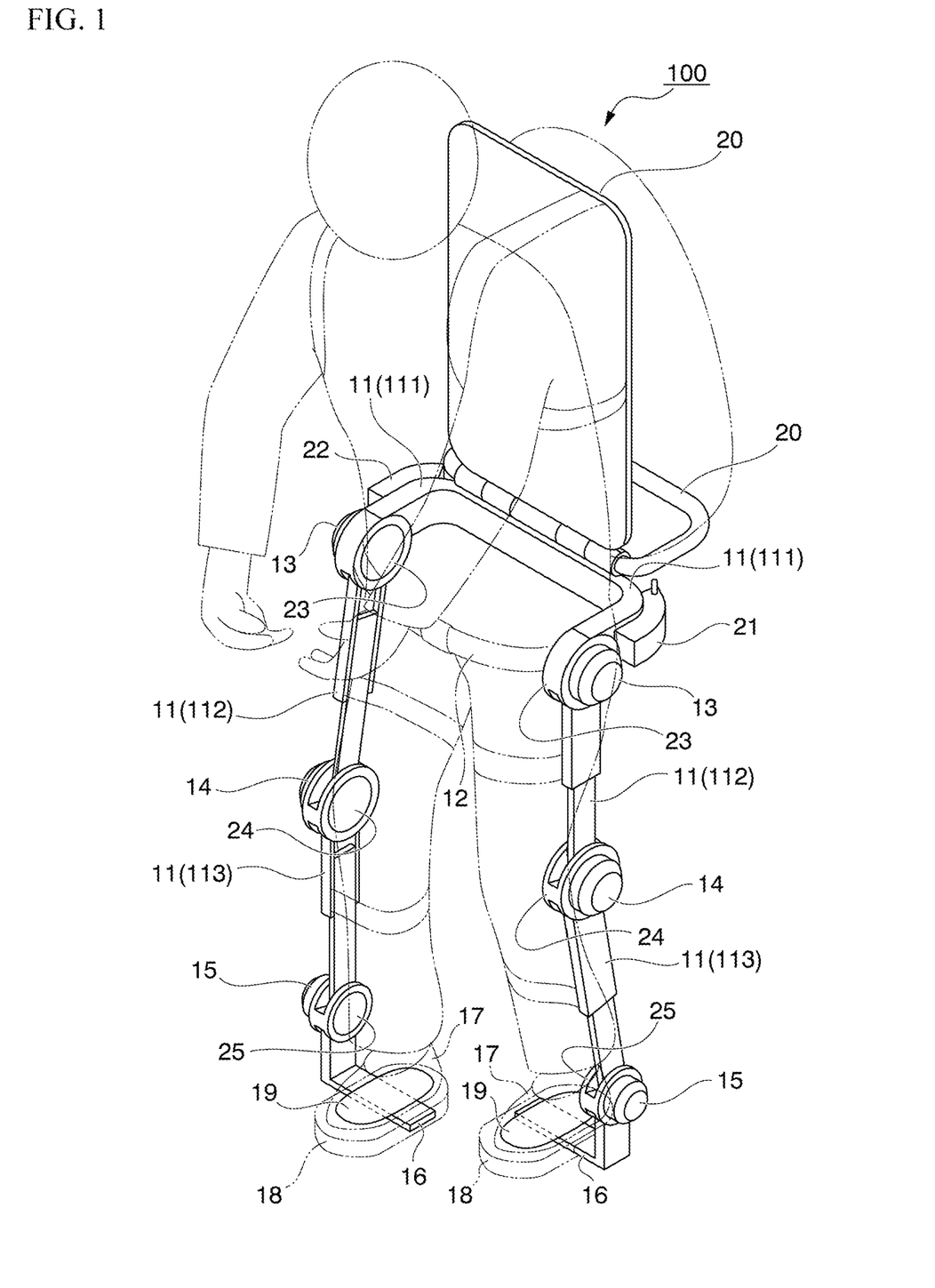
FIG. 1 is a diagram showing a configuration of a powered suit according to a first embodiment of the present invention.

FIG. 1 is a diagram showing a configuration of a powered suit according to the present embodiment.

The powered suit 100 is one aspect of the load reduction device. The powered suit 100 is constituted by a skeleton portion 11, a belt 12, a hip actuator 13, a knee actuator 14, an ankle actuator 15, a shoe sole plate 16, a foot harness 17, a shoe sole load sensor 18, a foot sole load sensor 19, a loading platform 20, a control device 21, a battery 22, a hip joint sensor 23, a knee joint sensor 24, an ankle joint sensor 25, and the like. The skeleton portion 11 is roughly classified into a first skeleton portion 111, a second skeleton portion 112, and a third skeleton portion 113 as an example.

As shown in FIG. 1, the powered suit 100 is configured as follows so as to support the loading platform 20, which is one aspect of the mechanism for holding luggage as an example. That is, the powered suit 100 is provided with the first skeleton portion 111, and the left and right hip actuators 13 are coupled rotatable to the first skeleton portion 111 and the second skeleton portion 112, which corresponds to the left or right thigh portion of the user wearing the powered suit 100, respectively. The left and right knee actuators 14 couple rotatable the corresponding second skeleton portion 112 on the left or right side and the corresponding third skeleton portion 113 along the left or right lower leg portion of the user wearing the powered suit 100. The ankle actuators 15 couple rotatable to the corresponding third skeleton portion 113 on the left or right side, and a corresponding shoe sole plate 16 provided on the back of the foot harness 17 on the left or right side of the user wearing the powered suit 100.

The hip actuator 13, the knee actuator 14, and the ankle actuator 15 are drive mechanisms 130 that output torque for rotationally driving a link (frame) connected at each joint of each leg of the user to reduce the load on the user. The first skeleton portion 111 and the second skeleton portion 112 are links to which the hip actuator 13 is connected. The second skeleton portion 112 and the third skeleton portion 113 are links to which the knee actuator 14 is connected. Further, the third skeleton portion 113 and the shoe sole plate 16 are links to which the ankle actuator 15 is connected. Each link and drive mechanism 130 constitute a link mechanism.

The hip joint sensor 23 is installed in the hip actuator 13, and detects the hip joint angle, that is, the angle formed between the first skeleton portion 111 and the second skeleton portion 112, by an encoder. The knee joint sensor 24 is installed in the knee actuator 14, and detects the knee joint angle, that is, the angle between the second skeleton portion 112 and the third skeleton portion 113, by the encoder. The ankle joint sensor 25 is installed in the ankle actuator 15, and detects the ankle joint angle, that is, the angle between the third skeleton portion 113 and the shoe sole plate 16, by the encoder. The hip joint sensor 23, the knee joint sensor 24, and the ankle joint sensor 25 detect the angle of each joint of each leg of the user (hereinafter referred to as the "joint angle").

The shoe sole load sensor 18 is provided on the bottom of the foot harness 17 corresponding to the shoe worn by the user. The shoe sole load sensor 18 is provided on the ground contact surface side of the shoe sole plate 16 that transmits the weight of the powered suit 100 and luggage to the ground contact surface, and the foot harness 17 that transmits the user's weight to the ground contact surface so as to cover the entire back surface of the shoe sole plate 16 and the foot harness 17. The foot sole load sensor 19 is provided in the foot harness 17 so as to cover the entire sole surface so as to be able to measure the weight applied from the sole of the user. For example, the foot sole load sensor 19 may be provided between the insole of the foot harness 17 and the shoe sole plate 16.

As an example, electrodes are arranged in a matrix on the front and back of a thin sheet-like insulator in the shoe sole load sensor 18 and the foot sole load sensor 19. The shoe sole load sensor 18 and the foot sole load sensor 19 measure the electrical resistance of the lattice points of the electrodes, and output the measured values to the control device 21. The control device 21 calculates the pressure applied to each lattice point and the load on the entire surface of the sensor sheet on the basis of the electrical resistance value of each lattice point.

The user who wears the powered suit 100 puts his/her left and right feet into the corresponding foot harnesses 17, and fixes the first skeleton portion 111 to the waist with the belt 12 so that the first skeleton portion 111 is closely attached to the waist. The powered suit 100 has a structure in which most of the load of the luggage and the load of the powered suit 100 is released to the ground surface in contact with the soles of the feet via the skeleton portion 11 and the hip actuator 13, the knee actuator 14, and the ankle actuator 15. The user turns on the control device 21 of the powered suit 100. The control device 21 controls the hip actuator 13, the knee actuator 14, and the ankle actuator 15 so as to transmit as much of the device weight as possible, which is the sum of the load of the luggage loaded on the loading platform 20 and the weight of the powered suit 100, to the walking surface via the skeleton portion 11 and the hip actuator 13, the knee actuator 14, and the ankle actuator 15. Thereby, the powered suit 100 mitigates the burden such as the load of the luggage on the user who wears the powered suit 100 and performs various motions.

Figure 2:
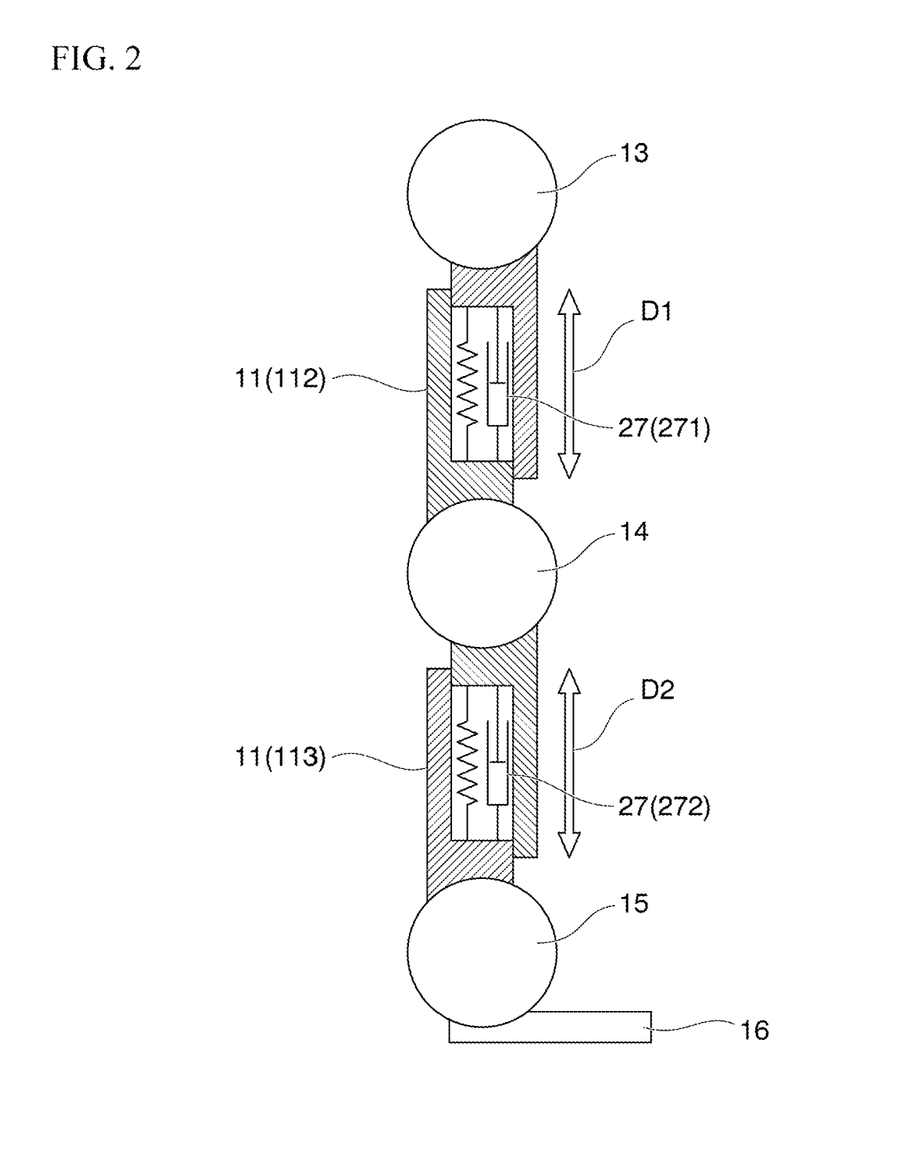
FIG. 2 is a diagram showing an example of a shock absorption mechanism according to the first embodiment of the present invention.

FIG. 2 is a diagram showing an example of the shock absorption mechanism according to the present embodiment.

The powered suit 100 is provided with a shock absorption mechanism 27 that can disperse the impact force in time by absorbing the impact force generated during the motion of the user. The shock absorption mechanism 27 is an elastic mechanism in which a spring and a dashpot, which are elastic bodies, are arranged in parallel or in series. As one example, the shock absorption mechanism 27 is roughly classified into a first shock absorption mechanism 271 provided in the second skeleton portion 112 and a second shock absorption mechanism 272 provided in the third skeleton portion 113. The first shock absorption mechanism 271 expands and contracts in the direction D1 along the second skeleton portion 112. The second shock absorption mechanism 272 expands and contracts in the direction D2 along the third skeleton portion 113. Thereby, the shock absorption mechanism 27 absorbs shocks applied to the legs and disperses the shocks in time.

Figure 3:
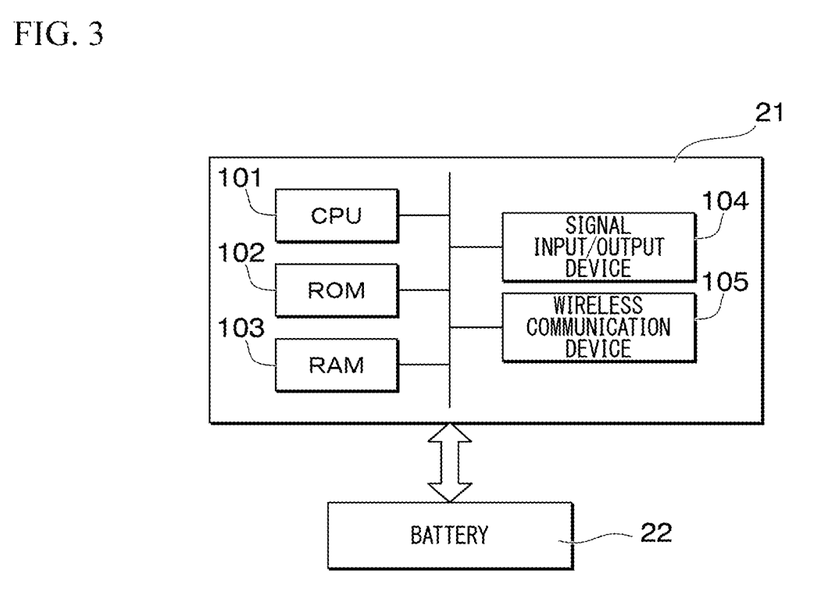
FIG. 3 is a diagram showing a hardware configuration of a control device according to the first embodiment of the present invention.

FIG. 3 is a diagram showing the hardware configuration of the control device.

As shown in this figure, the control device 21 is a computer provided with hardware such as a CPU (Central Processing Unit) 101, a ROM (Read Only Memory) 102, a RAM (Random Access Memory) 103, a signal input/output device 104, and a wireless communication device 105.

The signal input/output device 104 inputs signals output from the shoe sole load sensor 18, the foot sole load sensor 19, the hip joint sensor 23, the knee joint sensor 24, and the ankle joint sensor 25. The signal input/output device 104 outputs control signals for controlling the hip actuator 13, the knee actuator 14, and the ankle actuator 15. The control device 21 operates by power supplied from the battery 22.

The wireless communication device 105 is communicatively connected with another device.

Figure 4:
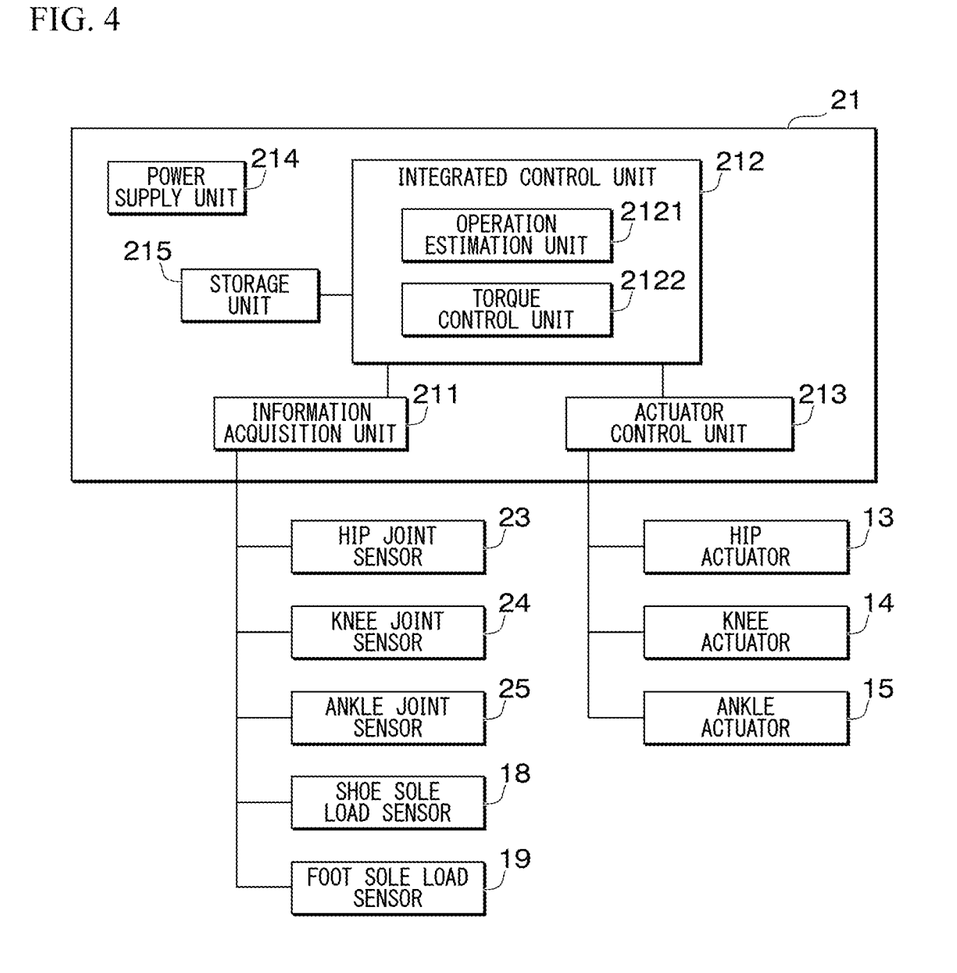
FIG. 4 is a function block diagram of a control device according to the first embodiment of the present invention.

FIG. 4 is a function block diagram of the control device.

The control device 21 is activated based on the power supplied from the battery 22 by turning on the power button. The control device 21 executes a control program after startup. As a result, the control device 21 is provided with at least an information acquisition unit 211, an integrated control unit 212, an actuator control unit 213, a power supply unit 214, and a storage unit 215.

The information acquisition unit 211 acquires sensing information from the shoe sole load sensor 18, the foot sole load sensor 19, the hip joint sensor 23, the knee joint sensor 24, and the ankle joint sensor 25. The sensing information of the shoe sole load sensor 18 and the foot sole load sensor 19 is load information indicating the electrical resistance value corresponding to the pressure (load) at the lattice points of each sensor. The sensing information of the hip joint sensor 23, the knee joint sensor 24, and the ankle joint sensor 25 is joint angle information indicating the detected joint angle.

The actuator control unit 213 controls the hip actuator 13, the knee actuator 14, and the ankle actuator 15.

When the power button is turned on, the power supply unit 214 supplies electric power from the battery 22 to each part of the control device 21.

The storage unit 215 stores an angle reference at each joint of the leg.

The integrated control unit 212 is provided with an operation estimation unit 2121 and a torque control unit 2122 of the shock absorption mechanism.

The operation estimation unit 2121 estimates the state of the shock absorption mechanism 27 on the basis of the operation of the shock absorption mechanism 27. For example, the operation estimation unit 2121 calculates a load value corresponding to a buffered impact on the basis of a preset operation estimation model of the shock absorption mechanism 27 as the state of the shock absorption mechanism 27, and outputs estimation information indicating the calculated load value to the torque control unit 2122.

The torque control unit 2122 controls the torque output by the hip actuator 13, the knee actuator 14, and the ankle actuator 15 based on the operation of the shock absorption mechanism 27. For example, the torque control unit 2122 subtracts the load value indicated by the estimation information input from the operation estimation unit 2121 from the load value applied to the sole or shoe sole as the impact cushioned by the shock absorption mechanism 27. The torque control unit 2122 calculates a target value of the torque output by the hip actuator 13, the knee actuator 14, and the ankle actuator 15 based on the load value after subtraction and the joint angles detected by the hip joint sensor 23, the knee joint sensor 24, and the ankle joint sensor 25.

Next, the operation of the control device 21 will be described in detail.

Figure 5:
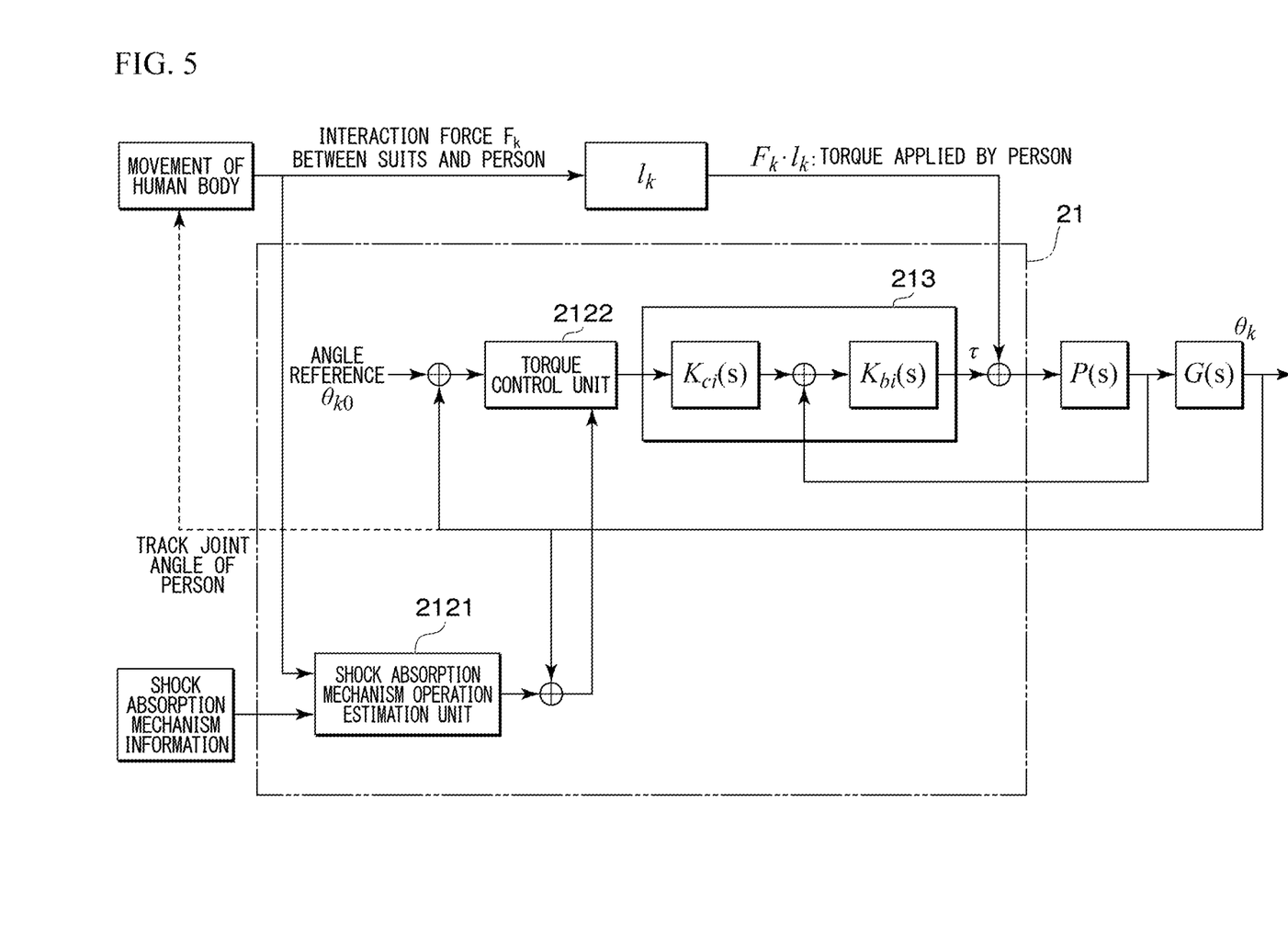
FIG. 5 is an operation block diagram showing the operation of the control device according to the first embodiment of the present invention.

FIG. 5 is an operation block diagram showing the operation of the control device according to the present embodiment.

First, the operation estimation unit 2121 estimates the state of the shock absorption mechanism 27 on the basis of the operation estimation model of the shock absorption mechanism 27 set in advance. Specifically, the operation estimation unit 2121 estimates the state of the shock absorption mechanism 27 by the operation estimation model on the basis of the shock absorption mechanism information indicating the operating status of the shock absorption mechanism 27, load values of each leg detected by the shoe sole load sensor 18 or the foot sole load sensor 19, and the joint angle $\theta_k$ detected by the hip joint sensor 23, the knee joint sensor 24, and the ankle joint sensor 25 of each leg. The shock absorption mechanism information includes, for example, the spring length indicating the current length of the spring, the dashpot length indicating the current length of the dashpot, the expansion/contraction speed of the spring and the dashpot, and the load values applied to the spring and the dashpot. The operation estimation unit 2121 estimates, for example, a load value corresponding to the buffered impact as the state of the shock absorption mechanism 27. Then, the operation estimation unit 2121 outputs the estimation information indicating the estimated state of the shock absorption mechanism 27 to the torque control unit 2122.

The torque control unit 2122 performs the following series of processes using the estimation information input from the operation estimation unit 2121, a load value of each leg detected by the shoe sole load sensor 18 or the foot sole load sensor 19, the joint angle $\theta_k$ detected by the hip joint sensor 23, the knee joint sensor 24, and the ankle joint sensor 25 of each leg, and the angle reference $\theta_{k0}$ of each joint. That is, the torque control unit 2122 detects characteristics of the user's motion at the present time in real time and sequentially estimates the operation of the powered suit 100 by using the operation estimation model of the entire powered suit 100 built-in inside. Then, the torque control unit 2122 calculates target values of the torque output by the hip actuator 13, the knee actuator 14, and the ankle actuator 15. That is, using the estimation information, the current load values, the angle reference $\theta_{k0}$ of each joint, and the current joint angle $\theta_k$ of each joint of each leg, the torque control unit 2122 calculates the target values of the torque output by the hip actuator 13, the knee actuator 14, and the ankle actuator 15 of each leg on the basis of the preset operation estimation model.

For example, the torque control unit 2122 may use the load values to determine whether each leg is in the swing state or the stance state. As an example, the torque control unit 2122 makes a determination of a stance period when the load value is equal to or greater than the first threshold value, and makes a determination of a swing period when the load value is equal to or less than the second threshold value. Further, the torque control unit 2122 subtracts the load value included in the estimation information from the load value of each leg detected by the shoe sole load sensor 18 or the foot sole load sensor 19 as an impact buffered by the shock absorption mechanism 27. Then, based on the operation estimation model during the swing phase or the operation estimation model during the stance phase, the torque control unit 2122 uses the load value of each leg after subtraction and the joint angles of each leg to calculate the target value of the torque at each joint of each leg. The torque control unit 2122 outputs the calculated target values of the hip actuator 13, the knee actuator 14, and the ankle actuator 15 to the actuator control unit 213.

The actuator control unit 213 controls the rotation angles of the hip actuator 13, the knee actuator 14, and the ankle actuator 15 with an angle controller $K_{ci}(s)$ on the basis of the target values. "s" indicates the frequency domain of the control system. Subsequently, the actuator control unit 213 calculates the torque τ at the current timing for the hip actuator 13, the knee actuator 14, and the ankle actuator 15 of each leg by the force controller $K_{bi}(s)$, and outputs a signal indicating each torque τ to each of these actuators.

Thereby, the interaction force $F_k$ between suits and person applied by the user, the applied torque $l_k$ applied by the user, and the output torque τ in the kth of the time series (current value) become the dynamics P(s) of each actuator. The hip joint sensor 23, the knee joint sensor 24, and the ankle joint sensor 25 detect each joint angle $\theta_k$ in the kth of the time series according to the dynamics G(s) of the powered suit 100 based on the dynamics P(s) of the hip actuator 13, the knee actuator 14, and the ankle actuator 15. Then, the control device 21 repeats the above-described processing.

Note that the actuator control unit 213 calculates the torque τ using the following torque calculation formula as an example. In this torque calculation formula (1), "(θ)/G(s)" indicates a feedback factor to the actuator control unit 21. "$F_k \cdot l_k$" indicates a feedforward factor. $T_i$ indicates the target value of the torque calculated by the torque control unit. f(θ) indicates a function including an angle θ based on the angle reference of the hip actuator 13, the knee actuator 14, and the ankle actuator 15. The torque calculation formula below is an example, and a formula other than the torque calculation formula shown below may be used. In the torque calculation formula (1), "s" indicates the frequency domain of the control system, $K_{bi}$ indicates the control model of the force controller, and $K_{ci}$ indicates the control model of the angle controller.

$$\tau = K_{bi}(s)\{T_i \cdot K_{ci}(s) - f(\theta)/G(s) + F_k \cdot l_k\} \quad (1)$$

Figure 6:
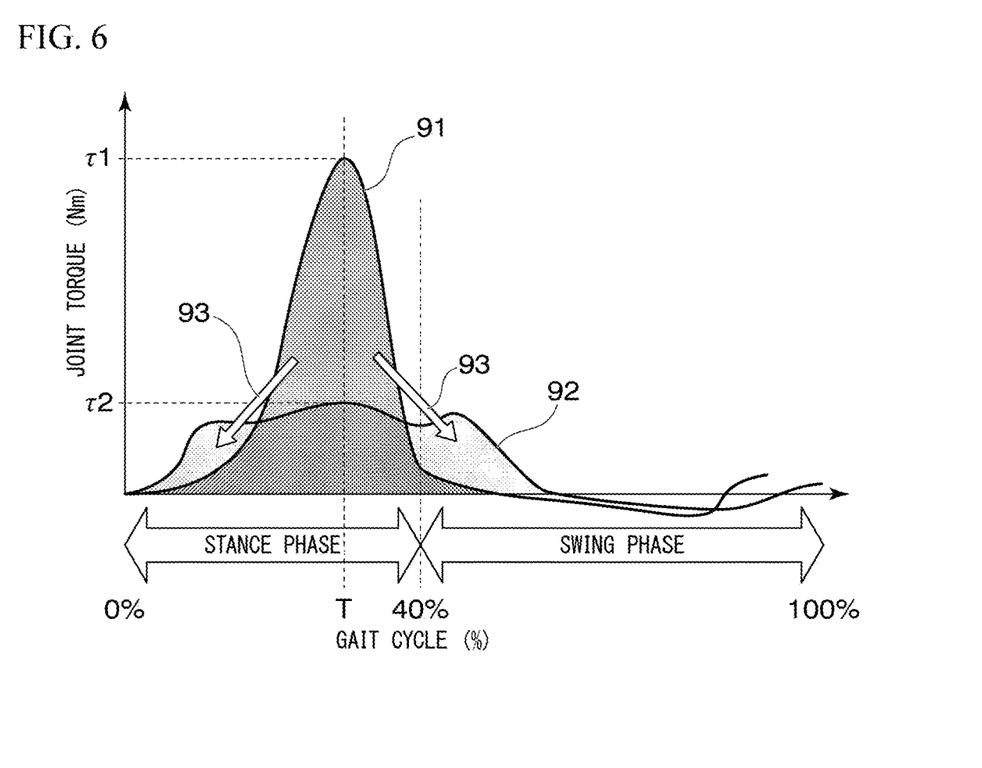
FIG. 6 is a graph showing a transition of joint torque in a gait cycle according to the first embodiment of the present invention.

FIG. 6 is a graph illustrating the transition of joint torque in the gait cycle according to the present embodiment.

In this figure, the solid line 91 shows the transition of the joint torque when the shock absorption mechanism 27 is not provided in the gait cycle in which the start to the end of the walking step of the user is one unit. The joint torque is a target value (unit: Nm (Newton meter)) of the torque output by the hip actuator 13, the knee actuator 14, and the ankle actuator 15 at each joint. The solid line 92 shows the transition of the joint torque when the shock absorption mechanism 27 is provided in the gait cycle. In the graph, the horizontal axis shows the percentage of time elapsed from the start to the end of the walking step of the gait cycle. The period from 0% to 40% in this gait cycle indicates the stance period in which the foot is placed on the ground plane (the leg is erected). The period from 40% to 100% in this gait cycle shows the swing period in which no load is applied to the shoe sole load sensor 18 and the foot sole load sensor 19 (the leg is being a swing) due to the foot being separated from the ground contact surface (ground). In the graph, the vertical axis shows the joint torque.

When the shock absorption mechanism 27 is not provided, the joint torque at peak time T is τ1, whereas when the shock absorption mechanism 27 is provided, the joint torque at peak time T is τ2, which is less than half of τ1. This is because the shock absorption mechanism 27 absorbs the energy of the shock from the ground and transmits the energy to the ground, whereby the energy can be dispersed in the time before and after as shown by the arrow 93. As a result, the joint torque required at peak time T can be reduced.

Figure 7:
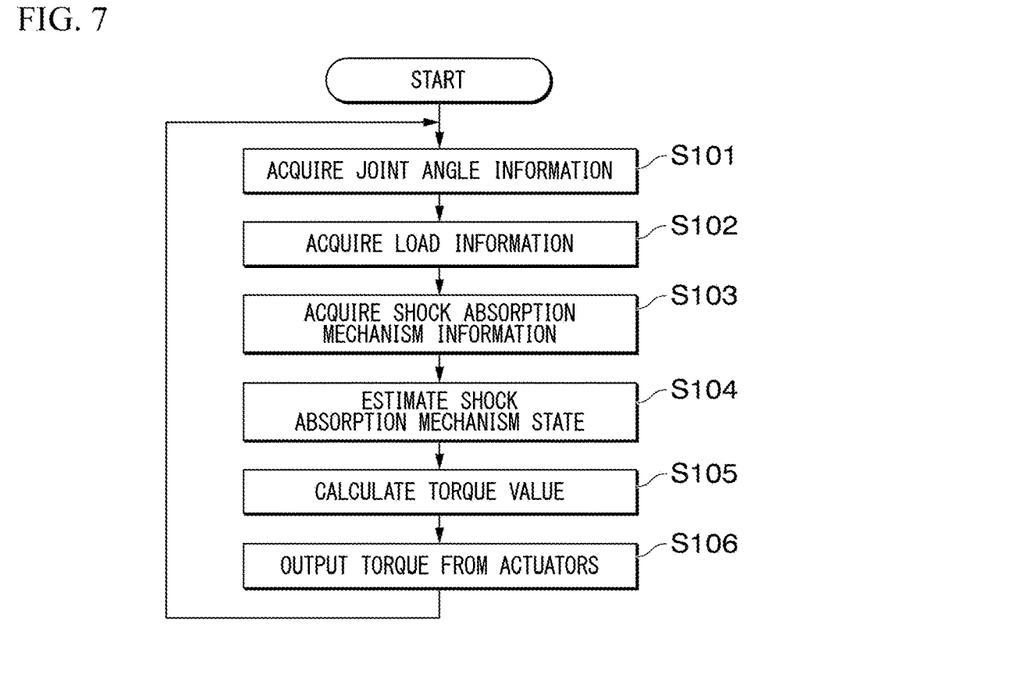
FIG. 7 is a diagram showing a processing flow of a powered suit according to the first embodiment of the present invention.

FIG. 7 is a diagram showing a processing flow of the powered suit according to the present embodiment.

First, the user wears the powered suit 100. At this time, the user inserts the foot sole load sensor 19 inside the foot harness 17. The foot sole load sensor 19 may be provided inside the foot harness 17 in advance. As the area of the foot sole load sensor 19, a size suitable for the size of the user's foot may be used. Further, the user attaches the shoe sole load sensor 18 to the ground contact surface side of the foot harness 17 or the shoe sole plate 16 of the powered suit 100. The shoe sole load sensor 18 may also be provided in advance on the ground contact surface side of the foot harness 17 or the shoe sole plate 16. As the area of the shoe sole load sensor 18, a size suitable for the foot harness 17 corresponding to the size of the user's foot may be used.

The user operates the power button of the control device 21 provided in the powered suit 100 to turn on the power. As a result, the control device 21 is started. The user performs motions such as walking, running, leaping, and jumping off while wearing the powered suit 100. The user may load luggage on the loading platform 20 of the powered suit 100 and perform motions such as walking, running, leaping, and jumping. The actuator control unit 213 of the control device 21 controls the hip actuator 13, the knee actuator 14, and the ankle actuator 15 so as to reduce the load on the user due to the weight of the luggage or the powered suit 100. Thereby, the powered suit 100 tracks various motions of the user.

While the control device 21 is being driven, the information acquisition unit 211 acquires joint angle information from the hip joint sensor 23, the knee joint sensor 24, and the ankle joint sensor 25 at predetermined intervals (Step S101). Further, while the control device 21 is being driven, the information acquisition unit 211 acquires load information from the shoe sole load sensor 18 and the foot sole load sensor 19 at predetermined intervals (Step S102). In addition, while the control device 21 is being driven, the information acquisition unit 211 acquires acceleration information from the shock absorption mechanism 27 (Step S103). The predetermined interval is, for example, every short time such as every 10 milliseconds.

The operation estimation unit 2121 estimates the state of the shock absorption mechanism 27 based on the shock absorption mechanism information, the joint angle information, and the load information (Step S104). The torque control unit 2122 calculates the target value of the output torque output by the hip actuator 13, the knee actuator 14 and the ankle actuator 15 of each leg on the basis of the load value applied to each leg, the angle reference of each joint, and the joint angle of each joint of each leg (Step S105).

The actuator control unit 213 calculates each torque τ at the current timing based on the torque target values calculated for the hip actuator 13, the knee actuator 14, and the ankle actuator 15 of each leg, and outputs to the hip actuator 13, the knee actuator 14, and the ankle actuator 15 (Step S106). After that, the process returns to the process of Step S101, and the control device 21 repeats the processes from steps S101 to S106 until the process is completed.

According to the above processing, even when a large impact is applied to the powered suit 100, the impact is cushioned by the shock absorption mechanism 27, and transmitted to the hip actuator 13, the knee actuator 14 and the ankle actuator 15 of each joint via the frame of the link mechanism. Therefore, the required torque at the peak is reduced. Further, the torque control unit 2122 calculates the required torques of the hip actuator 13, the knee actuator 14, and the ankle actuator 15 based on the operation of the shock absorption mechanism 27. Therefore, the hip actuator 13, the knee actuator 14, and the ankle actuator 15 can output a more optimum and accurate required torque for the entire powered suit 100 in consideration of the operation of the shock absorption mechanism 27. By adopting this arrangement, the maximum torque value output by the hip actuator 13, the knee actuator 14, and the ankle actuator 15 of each joint can be reduced. For that reason, the hip actuator 13, the knee actuator 14, and the ankle actuator 15 can be made smaller and lighter. Therefore, the entire powered suit 100 can be made smaller and lighter, which makes handling easier for the user.

Further, when a device separate from the powered suit 100 performs the above processing, the real-time property may be impaired due to the delay in data transmission/reception. However, in the present embodiment, since the control device 21 included in the powered suit 100 executes the above process, it is possible to respond to a sudden motion of the user without delay.

Second Embodiment

Next, the second embodiment will be described.

Figure 8:
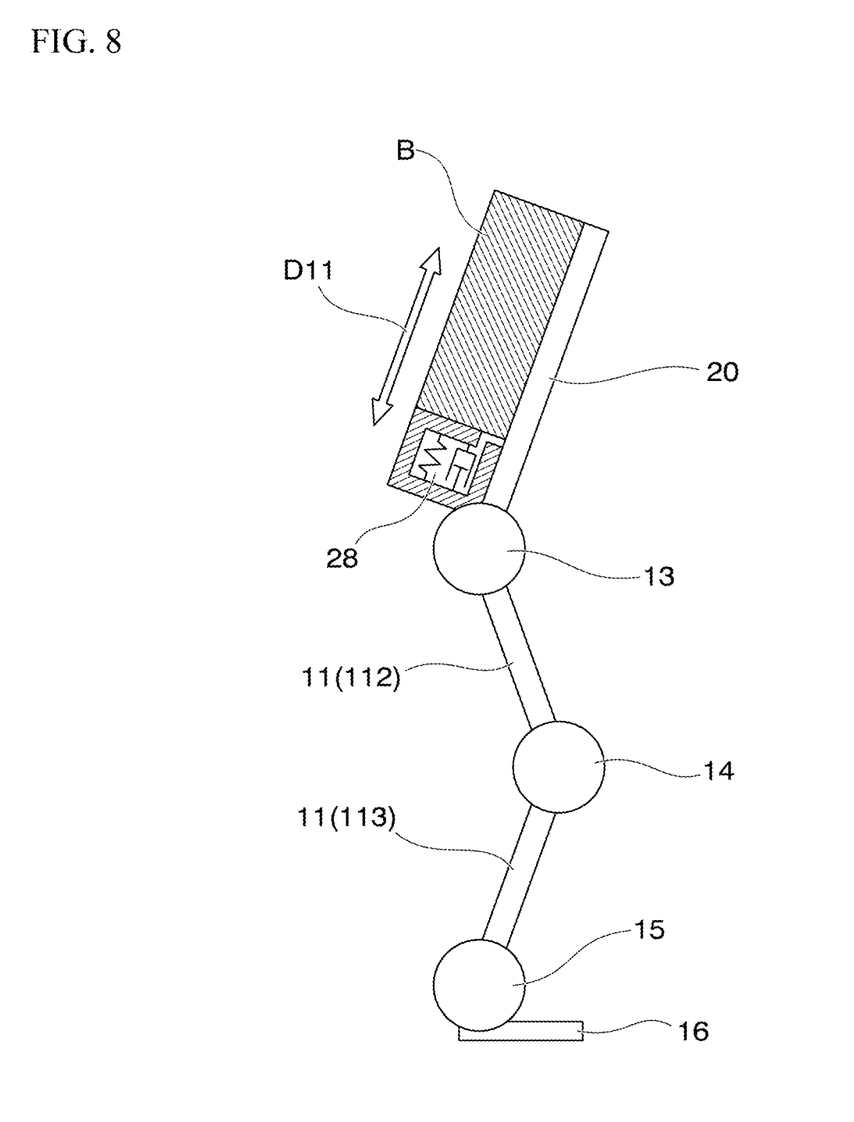
FIG. 8 is a diagram showing an example of a shock absorption mechanism according to a second embodiment of the present invention.

FIG. 8 is a diagram showing an example of the shock absorption mechanism according to the present embodiment.

The powered suit 100 in the present embodiment is provided with a shock absorption mechanism 28 instead of the shock absorption mechanism 27 in the first embodiment. The shock absorption mechanism 28 is a mechanism that can disperse a shock in time by absorbing the shock generated during a motion of the user. The shock absorption mechanism 28 is an elastic mechanism in which a spring and a dashpot, which are elastic bodies, are arranged in parallel or in series. The shock absorption mechanism 28 is provided at a position where luggage B of the loading platform 20 is loaded. That is, the shock absorption mechanism 28 is provided at a position corresponding to the back of the user. The luggage B is loaded on the shock absorption mechanism 28. The shock absorption mechanism 28 expands and contracts in the direction D1*l* along the back of the user (the back portion of the loading platform 20). As a result, the shock absorption mechanism 28 absorbs shocks applied to the legs and disperses the shocks in time. Since other configurations of the powered suit 100 are the same as those of the first embodiment, descriptions thereof will be omitted.

Third Embodiment

Next, the third embodiment will be described.

Figure 9A:
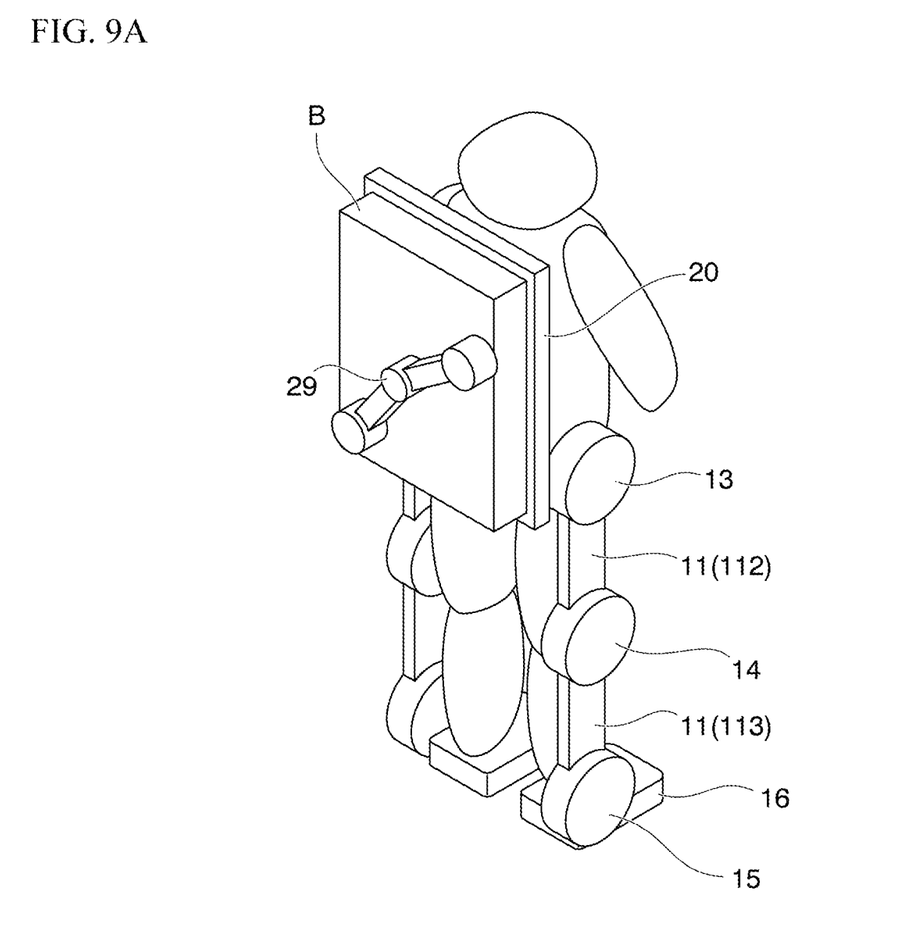
FIG. 9A is a first diagram showing an example of the shock absorption mechanism according to a third embodiment of the present invention.
Figure 9B:
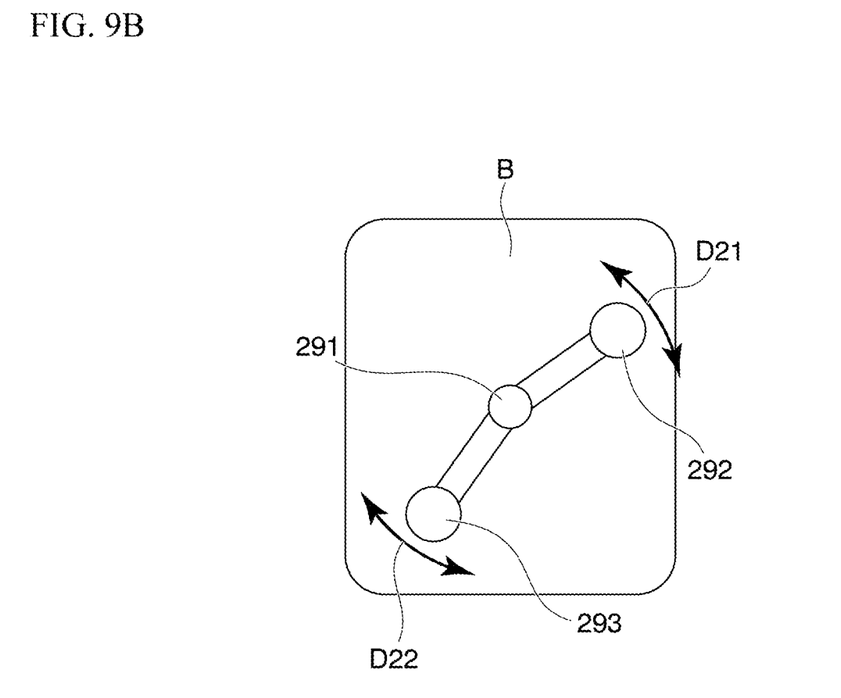
FIG. 9B is a second diagram showing an example of a shock absorption mechanism according to the third embodiment of the present invention.

FIGS. 9A and 9B are diagrams showing an example of the shock absorbing mechanism according to the present embodiment.

As shown in FIG. 9A, the powered suit 100 in this embodiment is provided with a shock absorption mechanism 29 instead of the shock absorption mechanism 27 in the first embodiment. The shock absorption mechanism 29 is a mechanism that can disperse a shock in time by absorbing the shock generated during a motion of the user. As shown in FIG. 9B, the shock absorption mechanism 29 is a counterbalance mechanism that achieves balance by causing two counters 292 and 293 to rotate around a rotation shaft 291. The shock absorption mechanism 29 is provided on the loading platform 20 or the luggage B. That is, the shock absorption mechanism 29 is provided at a position corresponding to the back of the user. The counter 292 rotates in the direction of arrow D21. The counter 293 rotates in the direction of arrow D22. As a result, the shock absorption mechanism 29 absorbs shocks applied to the legs and disperses the shocks in time. The shock absorption mechanism information in the present embodiment is the rotation angle, the rotation angular velocity, the additional centrifugal force, and the like of each counter 292, 293. Since other configurations of the powered suit 100 are the same as those of the first embodiment, descriptions thereof will be omitted.

Although one embodiment of the present invention has been described above, the present invention is not limited to the above-described embodiment, and various modifications can be made within a scope not departing from the spirit of the present invention.

One aspect of the present invention can be variously modified within the scope of the claims, and the technical scope of the present invention encompasses embodiments obtained by suitably combining technical means disclosed respectively in the different embodiments. In addition, elements described in each of the above-described embodiments and modifications, and configurations in which elements having the same effect are replaced with each other are also included.

For example, the shoe sole load sensor 18 may be provided in advance on a side of the ground contact surface of the shoe sole plate 16 of the powered suit 100. Further, the foot sole load sensor 19 may be inserted in advance inside the foot harness 17.

Further, in the above description, it was shown that the shoe sole load sensor 18 has an area that covers the entire back surface of the foot harness 17, and the foot sole load sensor 19 has an area that covers the entire sole in the inner part of the foot harness 17. However, the shoe sole load sensor 18 may be capable of measuring the load applied to the ground contact surface from the shoe sole plate 16 or the foot harness 17 even when the position where the load is applied deviates.

Further, in the above description, the case of controlling the powered suit 100 was illustrated, but the control device 21 is not limited thereto, and can be applied to general control of a multi-joint robot or the like (for example, a humanoid robot) having a non-linear mode transition.

Further, in the above example, the control device 21 is provided in the powered suit 100, but the present invention is not limited thereto, and another device that is communicatively connected with the powered suit 100 by wires or wirelessly may have the function of the control device 21.

Further, in the above description, the powered suit 100 is provided with the hip actuator 13, the knee actuator 14, and the ankle actuator 15 corresponding respectively to each joint, but is not limited thereto. The powered suit 100 may have at least one of the hip actuator 13, the knee actuator 14, and the ankle actuator 15. For example, the powered suit 100 may be provided with only the hip actuator 13 and the knee actuator 14, and does not have to be provided with the ankle actuator 15. Alternatively, the ankle actuator 15 may be an actuator that does not use a control signal, such as a mechanical leaf spring. In this case, the ankle joint sensor 25 is an angle detection sensor that detects the bending angle of the leaf spring or a force sensor that detects the reaction force of the leaf spring. The torque control unit 2122 calculates the target value of the torque output by the hip actuator 13 and the knee actuator 14 based on the bending angle of the leaf spring or the reaction force of the leaf spring detected by the ankle joint sensor 25.

Further, in the above description, the powered suit 100 is provided with both the shoe sole load sensor 18 and the foot sole load sensor 19, but is not limited thereto, and either one of the shoe sole load sensor 18 and the foot sole load sensor 19 may be provided.

Figure 10:
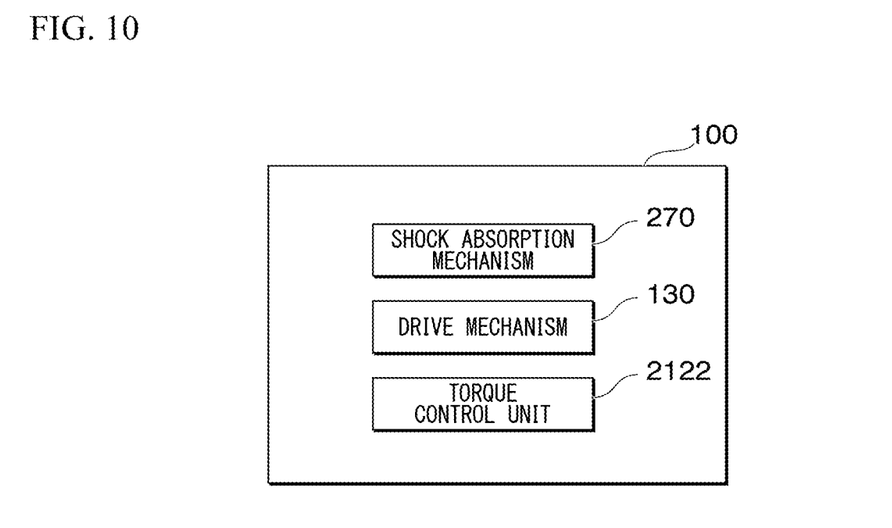
FIG. 10 is a diagram showing the minimum configuration of the powered suit of the present invention.

FIG. 10 is a diagram showing the minimum configuration of the powered suit.

As one aspect of the load reduction device, the control device 21 may have at least the functions of a shock absorption mechanism 270, the drive mechanism 130 and the torque control unit 2122.

The shock absorption mechanism 270 absorbs impact force generated when a user moves and thereby disperses the impact force in time. The shock absorption mechanism 270 is a general term for the shock absorption mechanism mechanisms 27, 28, 29 described above, and any one or any combination of these shock absorption mechanisms 27, 28, 29 may be used.

The drive mechanism 130 outputs torque for reducing the load applied to the user at the joints of the user's legs. The drive mechanism 130 is any one or any combination of the hip actuator 13, the knee actuator 14, and the ankle actuator 15.

The torque control unit 2122 controls the torque output by the drive mechanism 130 on the basis of the operation of the shock absorption mechanism 270.

The minimum configuration of the control device 21 may be provided with at least the function of the torque control unit 2122.

The above-mentioned control device 21 may also be a computer provided with hardware such as the CPU (Central Processing Unit) 101, the ROM (Read Only Memory) 102, the RAM (Random Access Memory) 103, an HDD (Hard Disk Drive) 104, and the wireless communication device 105.

The control device 21 described above has a computer system inside. The process of each processing described above is stored in a computer-readable recording medium in the form of a program, with the process being performed by the computer reading and executing this program. Here, the computer-readable recording medium refers to a magnetic disk, a magneto-optical disk, a CD-ROM, a DVD-ROM, a semiconductor memory, or the like. Further, this computer program may be distributed to a computer via a communication line, and the computer receiving the distribution may execute the program.

Further, the above-mentioned program may be for realizing some of the functions described above.

Moreover, the above-mentioned program may be a so-called differential file (differential program) that can realize the above-mentioned functions in combination with a program already recorded in the computer system.

Priority is claimed on Japanese Patent Application No. 2018-212803, filed Nov. 13, 2018, the content of which is incorporated herein by reference.

INDUSTRIAL APPLICABILITY

According to the present invention, it is possible to reduce the size and weight of a load reduction device.

REFERENCE SIGNS LIST

100: Powered suit
11: Skeleton portion
12: Belt
13: Hip actuator
14: Knee actuator
15: Ankle actuator
16: Shoe sole plate
17: Foot harness
18: Shoe sole load sensor
19: Foot sole load sensor
20: Loading platform
21: Control device
22: Battery
23: Hip joint sensor
24: Knee joint sensor
25: Ankle joint sensor
27, 28, 29: Shock absorption mechanism
211: Information acquisition unit
212: Integrated control unit
2121: Operation estimation unit
2122: Torque control unit
213: Actuator control unit
214: Power supply unit
215: Storage unit

The invention claimed is:

1. A load reduction device comprising:
a shock absorption mechanism in which an elastic body is arranged to absorb impact force generated when a user moves;
a drive mechanism configured to output torque for reducing a load applied to the user at a joint of a leg of the user; and
a torque controller configured to control the torque output by the drive mechanism on the basis of operation of the shock absorption mechanism,
wherein the shock absorption mechanism has a first shock absorption mechanism provided in a skeleton portion corresponding to a thigh of the user and a second shock absorption mechanism provided in a skeleton portion corresponding to a lower leg of the user,
the first shock absorption mechanism is configured to expand and contract in a first direction along the skeleton portion corresponding to the thigh, and the second shock absorption mechanism is configured to expand and contract in a second direction along the skeleton portion corresponding to the lower leg, and
the skeleton portion corresponding to the thigh and the skeleton portion corresponding to the lower leg are rotatably coupled,
wherein the shock absorption mechanism is configured to estimate a state of the shock absorption mechanism based on load information indicating load values of each leg, and joint angle information indicating an angle of the joint, and shock absorption mechanism information indicating an operating status of the shock absorption mechanism, which includes at least one of a length of the elastic body, an expansion/contraction speed of the elastic body, or a load value applied to the elastic body, and
wherein the torque controller is configured to control the torque based on the estimated state of the shock absorption mechanism, the load information, and the joint angle information.

2. The load reduction device according to claim 1, wherein the shock absorption mechanism disperses the impact force by an elastic body.

3. The load reduction device according to claim 1, wherein the first shock absorption mechanism is provided along each thigh of the user, and the second shock absorption mechanism is provided along each lower leg of the user.

4. The load reduction device according to claim 1, wherein the shock absorption mechanism is further provided at a position corresponding to a back of the user.

5. The load reduction device according to claim 1, wherein the shock absorption mechanism is further provided in a luggage-holding mechanism mounted on the user.

\* \* \* \* \*